United States Patent
Niwa et al.

(10) Patent No.: US 6,390,807 B1
(45) Date of Patent: May 21, 2002

(54) POT TYPE OIL BURNER WITH UNNOTICEABLE BAD ODOR

(76) Inventors: Osamu Niwa, 508 Higashiyama 2-chome, Nisshin, Aichi-ken; Koichi Watanabe, 9-1-5 Horitadori, Mizuho-ku, Nagoya, Aichi-ken, both of (JP)

( * ) Notice: Subject to any disclaimer, the term of this patent is extended or adjusted under 35 U.S.C. 154(b) by 0 days.

(21) Appl. No.: 09/795,118

(22) Filed: Mar. 1, 2001

(51) Int. Cl.$^7$ ............................................. F23N 5/00
(52) U.S. Cl. ........................... 431/29; 431/72; 431/75; 431/331; 431/333; 126/95
(58) Field of Search ............................ 431/208, 29, 18, 431/72, 73, 75, 76, 331, 333, 337; 126/45, 95, 96

(56) References Cited

U.S. PATENT DOCUMENTS

| 4,525,137 A | * | 6/1985 | Tomioka et al. | ............. 431/208 |
| 4,543,056 A | * | 9/1985 | Sakakibara | .................. 431/29 |
| 4,767,316 A | * | 8/1988 | Nakamura et al. | .......... 431/121 |
| 4,770,627 A | * | 9/1988 | Yoshino | ....................... 431/18 |
| 5,964,585 A | * | 10/1999 | Nakamura et al. | .......... 431/208 |

FOREIGN PATENT DOCUMENTS

JP          60-36833      11/1985
JP          3-35956        7/1991

* cited by examiner

Primary Examiner—James C. Yeung
(74) Attorney, Agent, or Firm—Townsend M. Belser, Jr.; Nexsen Pruet Jacobs & Pollard LLC

(57) ABSTRACT

The present invention relates to a structure in which an unburnt gas can be prevented from being diffused into a room while suppressing the generation of the unburnt gas during the extinction operation of a pot type oil burner. During the extinction operation, first of all, the supply of a fuel from fuel feeding means (35) to a pot (15) is stopped and conduction to an electric heater (31) is started. The rotation of each of a combustion fan (23) and a convection fan (11) is carried out continuously. While a second timer (67) counts a second time period, the convection fan (11) is rotated at a high speed. After the second time period is ended, the rotation of the convection fan (11) is switched from high speed rotation into low speed rotation. The low speed rotation is carried out continuously for a third time period counted by a third timer. After the third time period is ended, the rotation of the convection fan (11) is returned from the low speed rotation to the high speed rotation. During the low speed rotation, an unburnt gas discharged from an air outlet (3) of a frame body (1) to the outside is raised to a ceiling portion with a natural convection so that the diffusion of the unburnt gas can be suppressed.

9 Claims, 3 Drawing Sheets

POT TYPE OIL BURNER WITH UNNOTICEABLE BAD ODOR

BACKGROUND OF THE INVENTION

1. Field of the Invention

The present invention relates to a pot type oil burner, and more particularly to a pot type oil burner capable of suppressing diffusion of an incomplete combustion gas generated during the extinction operation of the pot type oil burner into a room while preventing the generation of the same gas.

2. Description of the Related Art

In generally, when the pot type oil burner is to be extinguished, the supply of a fuel into a pot is stopped and a combustion fan for feeding combustion air into the pot and a convection fan for feeding blowing air into a room are maintained to be rotated, and the fuel remaining in the pot is continuously combusted, thereby burning out the fuel in the pot and thus carrying out the extinction. The rotation of the combustion fan and the convection fan is continued until a frame body of the burner and the pot reaches a low temperature so that the frame body can be prevented from reaching a high temperature. However, a bad odor is generated in a process for completely burning out the unburnt fuel.

Therefore, there has conventionally been proposed a technique for preventing the bad odor from being generated during the extinction of the pot type oil burner. In a technique described in Japanese Utility Model Publication No. 3-35956 (1991), a combustion fan and a convection fan for feeding air into a room together with a combustion gas are stopped immediately after an extinction operation. According to this technique, an incomplete combustion gas can be prevented from being flowing from a pot, and furthermore, oxidization of an unburnt gas remaining in the pot in a high temperature state is accelerated therein in order to suppress the generation of a bad odor. In the pot type oil burner, however, even if a very long time passes after the extinction operation is started, the fuel remaining in a fuel feeding pipe may enter into the pot in some cases. For this reason, when the fan are stopped as in the conventional art, the fuel is collected in the pot and it takes a long time to decrease the temperature of the pot. Therefore, a frame body having the pot accommodated therein is locally heated and is brought into a dangerous state.

According to the technique described in the Japanese Utility Model Publication No. 60-36833 (1985), the direction of rotation of an indoor fan is reversed during the extinction operation and a combustion gas is bllowed out from the back side of a frame body of a burner. In the conventional art, a bad odor (an unburnt gas) can be prevented from blown out toward the side of a user of the burner during extinction such that the user does not smell the bad odor or malodor. However, a driving motor capable of instantaneously reversing the rotational direction is a very special motor, and an inexpensive motor such as an AC induction motor to be generally used cannot be utilized.

Moreover, there has conventionally been proposed that the structure of the pot is devised to reduce a fuel remaining in a liquid state in the pot as much as possible, thereby lessening the amount of generation of the bad odor. However, this technique cannot sufficiently prevent the user from smelling the bad odor (incomplete combustion gas).

It is an object of the present invention to provide a pot type oil burner capable of preventing the user from being noticing or feeling the generation of an incomplete combustion gas.

It is another object of the present invention to provide a pot type oil burner capable of preventing a flame from going out during extinction operation, thereby lessening the amount of generation of the incomplete combustion gas.

It is a further object of the present invention to provide a pot type oil burner capable of preventing the user from noticing or feeling the generation of the incomplete combustion gas by using a fan having an inexpensive motor as a driving source.

SUMMARY OF THE INVENTION

A pot type oil burner to be improved by the present invention comprises a frame body having an air outlet in a front part thereof, a cylindrical bottomed pot provided in the frame body and having a large number of through holes for air flow on a peripheral wall, a combustion fan including a first motor as a driving source and serving to supply combustion air into the pot through the through holes, combustion fan control means for controlling rotation of the first motor, thereby controlling an amount of air flow from the combustion fan, fuel feeding means for feeding a fuel into the pot through a fuel feeding pipe, fuel feeding control means for controlling a driving operation of the fuel feeding means, an electric heater to be energized from a start of ignition to a start of combustion, thereby heating the pot, heater control means for controlling the energization to the electric heater, a convection fan including a second motor as a driving source, attached to the frame body to feed air from an outside of the frame body into the frame body and to blow out the air into a room through the air outlet together with a combustion gas discharged from the pot, fan control means for con+rolling rotation of the second motor, thereby controlling an amount of air flow from the fan, and a control command generator for giving a control command to the combustion fan control means, the fuel feeding control means, the heater control means and the convection fan control means, respectively.

In the present invention, the control command generator is operated in the following manner. First of all, the control command generator outputs a fuel feeding stop command for stopping the driving operation of the fuel feeding means to the fuel feeding control means and outputs a heater energization command to the heater control means, in order to energize the heater for a predetermined first time period which is longer than a time period required for completely ending combustion, when an extinction command is input. Moreover, the control command generator outputs a rotation decrease command for decreasing the rotation of the second motor to the convection fan control means so as to decrease the amount of air from the convection fan after a predetermined second time period equivalent to a time period to be considered to start incomplete combustion after the extinction command is input passes, while a predetermined third time period to be considered to be required for reducing a combustion flame or extinguishing the flame in the pot then passes. Then, the control command generator outputs a fan stop command for stopping the combustion fan and the convection fan to the combustion fan control means and the convection fan control means after the first time period is ended.

In the present invention, the supply of the fuel is stopped during the extinction operation. Originally, the electric heater which is used for only the ignition operation is also used for the extinction to heat the pot such that the combustion flame does not go out in the pot during the extinction operation. Accordingly, it is possible to almost completely combust the unburnt gas in the pot. After the extinction is completed, a cracked gas is generated if the fuel remains in the pot. Consequently, a bad odor having a hard irritating smell is sprayed onto a user through the wind of the convection fan. However, even if the fuel remaining in the fuel pipe enters the pot after the extinction is completed, the fuel is oxidized with the air fed into the pot through the combustion fan in the high temperature atmosphere heated by the electric heater. Consequently, it is possible to prevent the bad odor from being generated from the fuel remaining in the pot.

In the present invention, particularly, the rotational speed of the convection fan is decreased for a period in which incomplete combustion might be generated after the extinction operation is started (that is, in the third time period) or thereafter (after the combustion flame is reduced or the extinction is carried out). Consequently, the flow velocity of the air blown out of the air outlet of the frame body is decreased. As a result, the air containing an incomplete combustion gas is raised in the room space without reaching the user present in the forward part of the frame body. Therefore, it is hard for the user to notice the generation of the incomplete combustion gas. The degree of the decrease in the rotation of the convection fan belongs to the range of design items. It is preferable that the rotational speed should be decreased without locally raising the temperature of the frame body such that the air containing the combustion gas blown out of the air outlet can be raised upward as rapidly as possible or immediately.

After the combustion of the unburnt gas is completed, it is preferable that the rotational speed of the convection fan should be raised. Thus, the frame body and the pot can be cooled in the early stage.

It is preferable that the speed of the convection fan should be decreased in a short time. If the forced braking means is provided on the motor for the convection fan, the rotational speed of the convection fan can be forcedly decreased to be a low speed.

Moreover, the rotational speed of the convection fan may be maintained to be constant in a low speed region or may be reduced gradually However, if the rotational speed of the convection fan is reduced as required or more, there is a possibility that the temperature of the frame body might be raised excessively. The rotational speed of the motor to be used as the driving source of the convection fan is monitored by the rotational speed detecting means. If the rotational speed of the motor is decreased lower than a predetermined rotational speed, it is preferable that the rotational speed of the convection fan should be increased.

Moreover, when the combustion flame in the pot is reduced, the incomplete combustion gas is easily generated. Therefore, the flame detecting means for detecting a flame is used to detect the size or the height of the flame in the pot. If the size of the flame is smaller than a predetermined size, the rotational speed of the combustion fan maybe decreased. Thus, the extinction can be carried out with an almost good balance of an air/fuel ratio between the unburnt gas and the air. Consequently, the amount of generation of the incomplete combustion gas can be decreased. According to the pot type oil burner of the present invention, ignition and combustion in a normal combustion state are controlled in the same manner as a conventional product.

These objects as well as other objects, features and advantages of the present invention will become more apparent to those skilled in the art from the following description with reference to the accompanying drawings.

DETAILED DESCRIPTION OF THE PREFERRED EMBODIMENT

Figure 1:
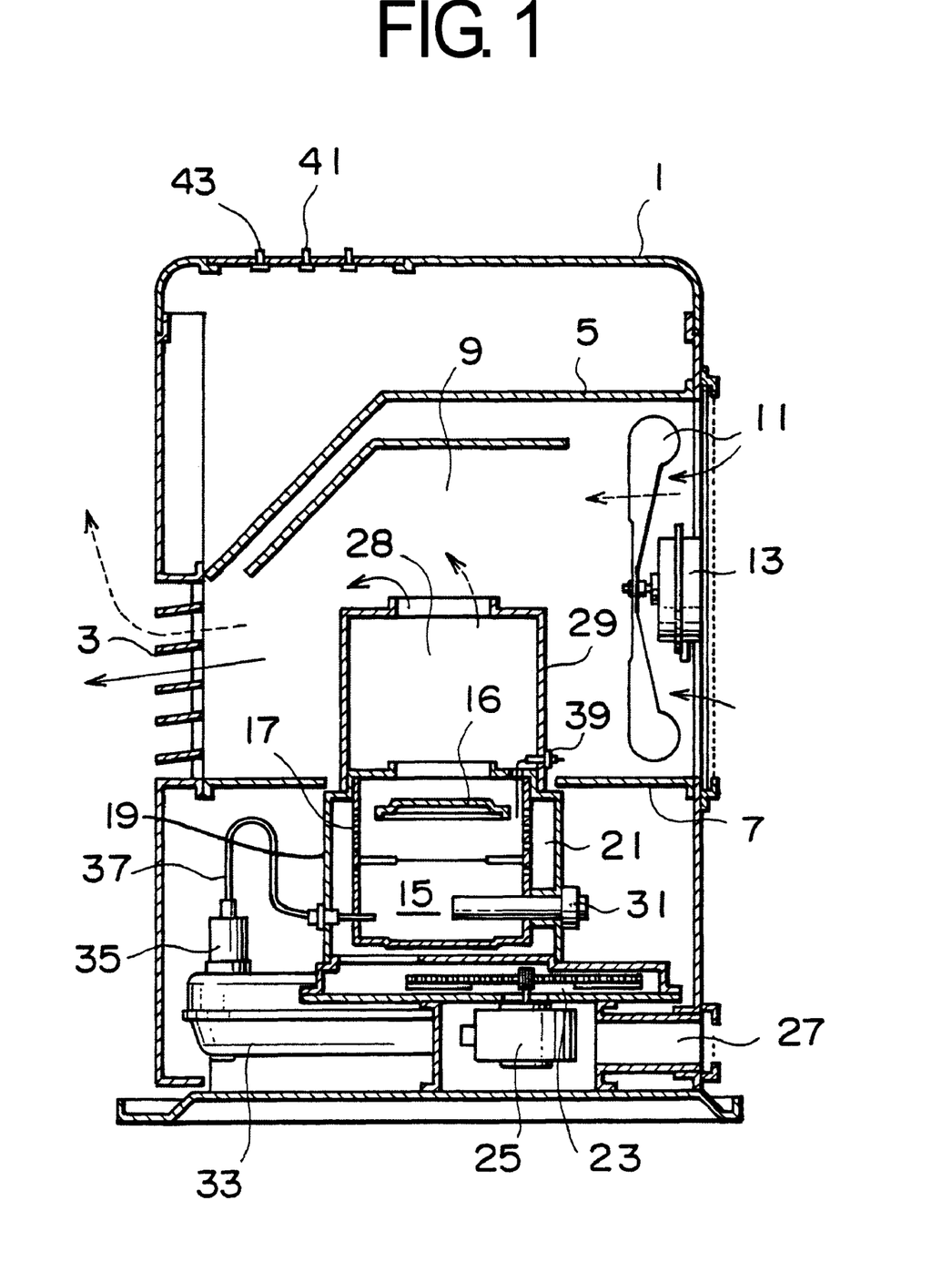
FIG. 1 is a schematic sectional view showing a pot type oil burner according to an embodiment of the present invention.

An embodiment of the present invention will be described below in detail with reference to the drawings. FIG. 1 is a sectional view showing an example of the structure of a pot type oil burner (a hot air type heater or a fan heater) according to the present invention. Since a basic structure is well known, it will be described briefly. In FIG. 1, the reference numeral 1 denotes a frame body having an hot air outlet 3 provided on a front wall. The inside of the frame body 1 is partitioned into three chambers by partition walls 5 and 7. The chamber formed between the partition walls 5 and 7 acts as a flow path 9. A convection fan 11 for feeding the room air into the flow path 9 is provided in the frame body 1. The convection fan 11 has an inexpensive motor 13 such as an AC induction motor as a driving source. A pot 15 is provided in the chamber formed under the partition wall 7. The pot 15 in a cylindrical shape having a bottom and is provided with a large number of through holes 17 at a peripheral wall with cause an air to flow into the pot 15. A cylinder 19 is provided on the outside of the pot 15, and an air duct 21 is formed between the pot 15 and the cylinder 19. A hole for causing the air to pass is formed in a bottom wall portion of the cylinder 19, and a combustion fan 23 is provided under the bottom wall portion. The combustion fan 23 is rotated by using a motor 25 as a driving source. In this specification, the motor 25 constitutes a first motor, and the motor 13 constitutes a second motor. When the combustion fan 23 is rotated, the air is sucked through a sucking port 27 and is supplied from the air duct 21 into the pot 15 through the through holes 17.

A combustion cylinder 29 forming a combustion chamber 28 is provided on the pot 15. The combustion chamber 28 is opened toward the flow path 9, and room air sucked through the convection fan 11 is mixed with a hot combustion gas flowing from the combustion chamber 28 and is blown out as hot air from a hot air outlet 3 provided in the front wall of the frame body 1. Moreover, an electric heater 31 constituted by a ceramic heater or the like is provided to penetrate through the peripheral wall portion of the pot 3. The heater 31 is provided to form a small gap together with the bottom portion of the pot 15, and serves to heat the bottom wall portion of the pot 15 and a stabilizing member 16 in the pot 15. Furthermore, the reference numeral 33 denotes an oil pan for receiving a fuel from a fuel tank which is not shown and for forming a constant oil surface therein. Moreover, the reference numeral 35 denotes a fuel pump including an electromagnetic pump provided on the oil pan 33, and draws up the fuel in the oil pan 33 through the fuel pump 35 and supplies the fuel into the pot 15 through a fuel feeding pipe 37. The pump 35 constitutes fuel feeding means.

Well-known flame detecting means 39 for detecting the size or height of a combustion flame in the pot 15 is provided above the opening of the pot 15. The flame detecting means 39 serves to detect that the combustion flame is generated in a normal condition or not, and to detect the top position of the flame based on a difference between a current (flame current) obtained when the frame touches an electrode of the flame detecting means 39 and a current obtained when it does not touch the same electrode. Accordingly, the output of the flame detecting means 39 is the current 1. When the flame detecting means 39 does not detect the flame, the combustion flame is very small and is brought into an extinction state soon or completely goes out.

A control switch including an ignition switch 41 and an extinction switch 43 is provided on a top plate of the frame body 1, and a combustion control device 45 (FIG. 2) which is not shown is provided in a space formed below the top plate.

Figure 2:
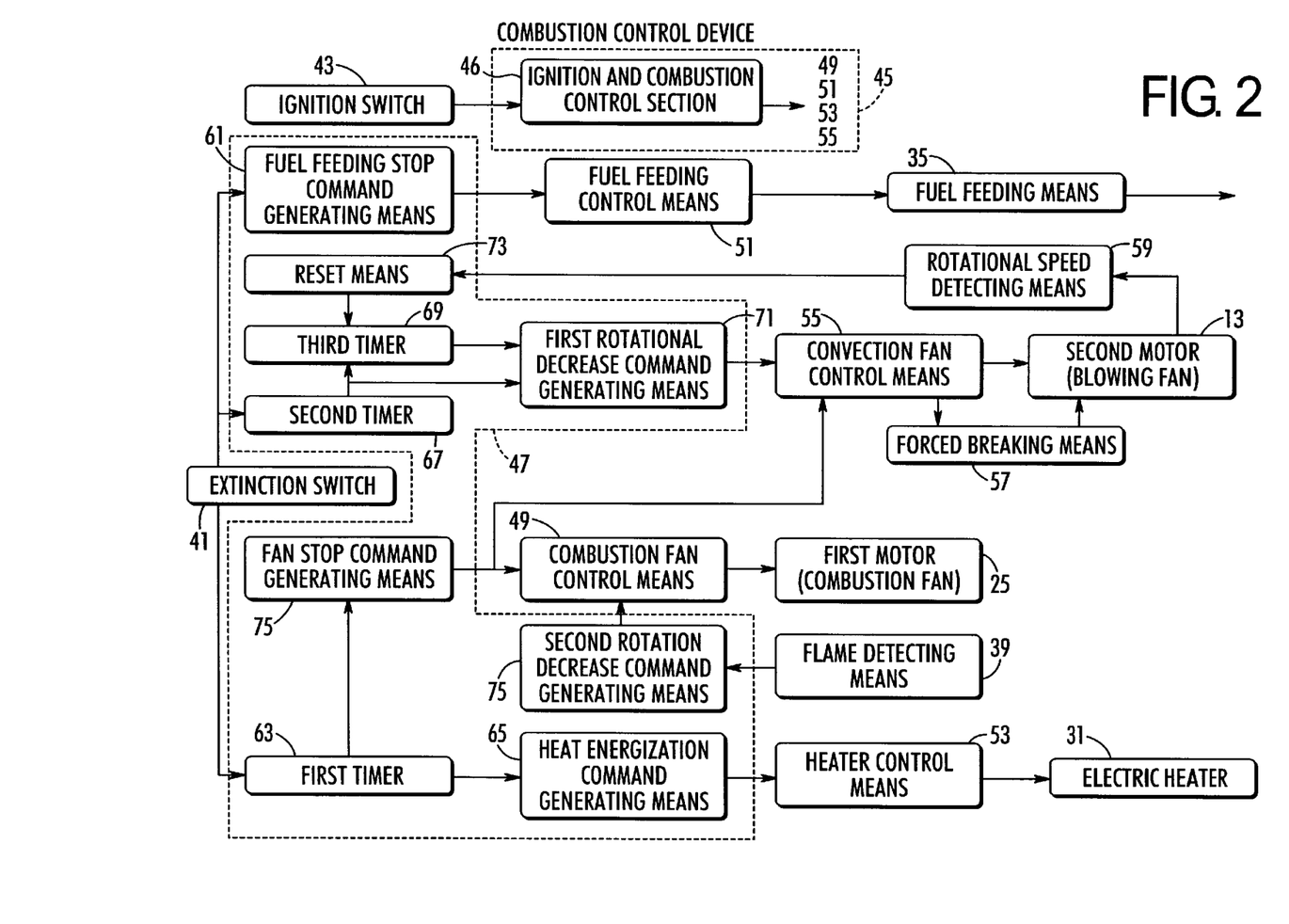
FIG. 2 is a block diagram showing the structure of a combustion control device to be used in the embodiment.
Figure 3:
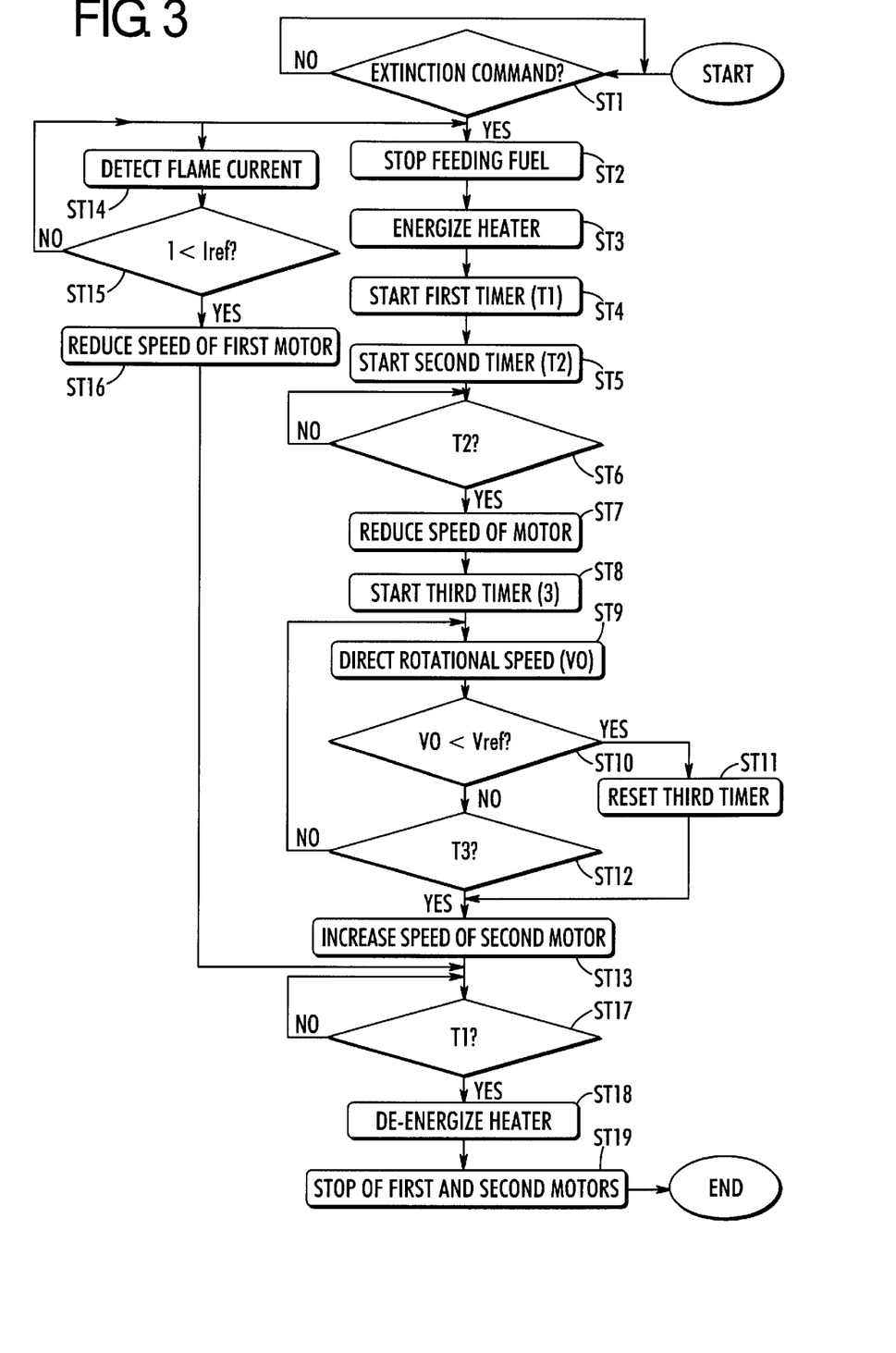
FIG. 3 is a flow chart showing an algorithm of software to be used in the case in which a main part of control command generating means illustrated in FIG. 2 is constructed by utilizing a microcomputer.

FIG. 2 is a block diagram schematically showing the structure of the main part of the combustion control device 45. FIG. 3 is a flow chart showing an algorithm of software to be used in the case in which the main control portion of a control command generator 47 used in the combustion control device 45 during an extinction operation is constructed by using a microcomputer. The ignition operation and the combustion control operation which are to be carried out after pressing down the ignition switch 43 are executed through the ignition and combustion control section 46. The ignition and combustion control section 46 serves to control the electric heater 31, the first and second motors 25 and 13 and the fuel pump 35 to be the fuel feeding means, to carry out the ignition operation and the combustion operation. The operations are well known and will be briefly described because they are not particularly related to the gist of the present invention. When the ignition switch 43 is turned on, the ignition and combustion control section 46 energizes the electric heater 31 to heat the pot 15. When the temperature of the pot 15 increases equivalent to that obtained during normal combustion, the ignition and combustion control section 46 gives commands to fuel feeding control means 51 and combustion fan control means 49 so that the fuel feeding means 35 and the combustion fan 23 supply the fuel and the air to the pot 15. At this time, the inside of the pot 15 to which the fuel and the air are supplied is set in a high temperature atmosphere. Therefore, the combustion is starts combustion immediately. Moreover, when the combustion is started in the pot 15, the ignition and combustion control section 46 outputs a command to fan control means 55, thereby rotating the convection fan 11. As a result, the hot combustion gas and the room air are blown out from the hot air duct 3 into the room together.

The combustion control device 45 includes the combustion fan control means 49, fuel feeding control means 51, heater control means 53, fan control means 55, forced braking means 57 and rotational speed detecting means 59 in addition to the ignition and combustion control section 46 and the control command generator 47. The combustion fan control means 49 controls the rotation of the first motor 25 of the combustion fan 23, thereby controlling the &mount of air flow from the combustion fan 23. The fuel feeding control means 51 controls the driving operation of the fuel feeding means 35. The heater control means 53 controls the energization to the electric heater 31. Furthermore, the convection fan control means 55 controls the rotational speed of the second motor 13 of the convection fan 11, thereby controlling the amount of air flow from the convection fan 11. Moreover, the forced braking means 57 causes a DC current to flow to an exciting winding of the second motor 13, thereby forcibly applying braking, and is operated in accordance with a command from the convection fan control means 55.

The control command generator 47 includes fuel feeding stop command generating means 61 for outputting a fuel feeding stop command for stopping the driving operation of the fuel feeding means 35 to the fuel feeding control means 51 when the extinction switch is pressed down to input a command for extinction. The fuel feeding stop command generating means 61 has the function of detecting the input of the extinction command. At steps ST1 and ST2 in FIG. 3, the fuel feeding stop command generating means 61 is realized.

When the extinction switch 41 outputs an extinction command, a first timer 63 starts counting and counts a predetermined first time period T1 (time) which is longer than a time period required for completely ending the combustion in the pot 15. Heater energization command generating means 65 outputs, to the heater control means 53, a heater energization command for energizing the heater 31 to heat the pot 15 until the first timer 63 completely counts the first time period T1. When the first timer 63 ends the counting, the heater energization command generating means 65 stops the output of the heater energization command so that the energization of the heater 31 is stopped. In the example of FIG. 3, the first timer 63 is realized by steps ST1, ST3 and STl7. Moreover, the heater energization command generating means 65 is realized by steps ST3 and ST18.

Furthermore, when a second timer 67 receives the extinction command, the second timer 67 starts counting a second time period T2 required for reducing the combustion flame in such manner to start generating incomplete combustion. In other words, the second time period T2 is equivalent to a tone period for which a large amount of unburnt gases remaining in the pot 15 can combust in the normal combustion in the pot 15. However, it is a matter of course that the time period T1 does not need So be accurate and may be previously obtained by an experiment roughly to some extent. For the second time period T2, the air flows in a oath shown in a solid-line arrow and the combustion gas generated in the pot 15 is blown out far away from the hot air outlet 3 together with the indoor air. When the second time period T2 passes, the amount of the unburnt gas in the pot 15 is decreased so that a good balance between the amount of the air to be supplied to the pot 15 and the remaining unburnt gas cannot be obtained and an incomplete combustion gas having a bad odor is generated. After the second timer 67 completes the counting of the second time period T2, a third timer 69 starts to count a third time period T3 required for almost completely combusting the unburnt gas remaining in the pot 15 (or required for considerably reducing the combustion flame or extinguishing the flame). The third time period To may also be predetermined by an experiment roughly to some extent. First rotation decrease command generating means 71 outputs a rotation decrease command for decreasing the rotational speed of the second motor 13 to the convection fan control means 55 to reduce the amount of air of the convection fan 11 while the third timer 69 carries out the counting the third time period T3 after the second timer 67 ends to count the second time period T2. The degree of a decrease in a rotational speed in response to the rotation decrease command is determined such that the hot air blown out of the outlet 3 of the frame body 1 is raised upward (toward a ceiling in the room) according to a natural convection as early as possible and the temperature of the frame body 1 is not locally raised. For example, in the case in which the second motor 13 is rotated at 1500 rpm, the rotational speed of the second motor 13 can be reduced to approximately 500 rpm. In the case in which the rotational speed of the second motor 13 is reduced to a predetermined low speed, it is preferable that the rotational speed should be reduced in a time which is as short as possible. When the time is prolonged, there is a higher possibility that the incomplete combustion gas might reach a place where the user is present. In the case in which an induction motor is to be phase-controlled, it is difficult to rapidly reduce the rotational speed In this example, therefore, the forced braking means 57 is used. The forced braking means 57 serves to cause a DC current to flow to the exciting winding of the second motor 13, thereby applying DC braking. When the rotation decrease command is input to the convection fan control means 55, the forced braking means 57 applies the forced braking to the second motor 13 in a short time. Preferably, a time for which the braking is applied is approximately one second, for example. After the braking is released, the second motor 13 is rotated at a low speed under control of the convection ran control means 55 in response to the rotation decrease command. The convection fan control means 55 is operated to reduce the rotational speed of the second motor 13 to be a predetermined low speed while receiving the rotation decrease command, and carries out control such that the second motor 13 is rotated at rated speed if the rotation decrease command is not given. In this state, the flow of the hot air shown in a broken-line arrow of FIG. 1 is obtained. The hot air is sent to the outside through the hot air outlet 3 and is exactly fed toward the ceiling in the room through a natural convection. As a result, a bad odor contained in the combustion gas does not reach the user who is front in the forward of the frame body 1, and the user does not notice the generation of the bad odor. The conditions for stopping the fan will be described later. In the example of FIG. 3, the second timer 67 is realized by steps ST1, ST5 and ST6 and the third timer 69 is realized by steps ST8 and ST12.

In this example, the electric heater 31 is set in a heating state for the third time period T3 and the inside of the pot 15 is maintained at a high temperature in the same manner as that in the combustion. At this time, accordingly, even if the combustion air is continuously fed into the pot 15, the pot 15 can be prevented from being cooled by the air and the combustion flame is not extinguished easily. Therefore, the combustion can be continuously carried out until the unburnt gas is gone, and a large amount of incomplete combustion gas can be prevented from being generated rapidly. When the third time period T3 is set to such a time, the bad odor generated during the extinction of the combustion flame has already been almost decreased at the end of the third time period T3 even if the extinction time period is varied due to the amount of fuel remaining in the pot 15 and the amount of unburnt gas. Consequently, even if the rotational speed of the convection fan 11 is then increased, the user does not smell the bad odor.

In this example, the convection fan control means 55 gradually reduces the rotational speed of the second motor upon receipt of the rotation decrease command such that the incomplete combustion gas is not blown out far away if possible. In order to implement the foregoing, after the rotational speed of the convection fan 11 is reduced by the forced braking means 57, the deceleration operation of the forced braking means 57 is then stopped and the energization of the second motor 13 is stopped. Consequently, such a change in the rotational speed can be implemented easily. After the energization of the second motor 13 is stopped, the second motor 13 is continuously rotated with inertia. Therefore the rotational speed of the fan 11 is gradually reduced so that the discharge amount of the combustion gas and the rotational speed can also be caused to approximate to each other. Referring to the reduction in the rotational speed with the inertia, however, the rotation of the fan 11 is sometimes stopped before the third timer 69 completes the counting depending on the conditions of disturbance in which a blast is jetted onto the fan 11 or when the user does not carry out maintenance in years so that the fan is dusty or the fan is out of lubricating oil. If such a situation occurs and the combustion is being continuously carried out at that time, the air feeding path 9 and the frame body 1 are instantaneously set to a high temperature after the air feeding is stopped, and particularly, a large amount of dust sticks to the air feeding path 9 and the convection fan 11 when maintenance failures are caused so that the dust might be ignited to cause fire accidents. In order to eliminate such problem, in this example, the rotational speed or the motor 13 to be used as the driving source of the convection fan 11 is monitored through the rotational speed detecting means 59 such as an optical type encoder utilizing a photosensor. If the rotational speed of the motor 13 is set to be equal to or lower than a predetermined rotational speed Vref, reset means 73 resets the third timer 69 to bring the third timer 69 into a counting completion state in order to stop the reduction in the rotational speed of the motor 13. Consequently, the first rotation decrease command generating means 71 stops the output of the rotation decrease command and the convection fan control means 55 carries out control to reset the rotational speed of the second motor 13 to an original rotational speed. For the rotational speed detecting means 59, it is possible to use a magnetic encoder having a combination of a hole element and a magnet.

In the example of FIG. 3, the first rotation decrease command generating means 71 is realized by steps ST7 and ST13 and the reset means 73 is realized by steps ST10 and ST11.

When the first timer 63 completes the counting, fan stop command generating means 75 outputs a fan stop command for stopping the combustion fan 23 and the convection fan 11 to the combustion far control means 49 and the convection fan control means 55. It is also possible to propose that the fan stop command is outputted immediately after the first timer 63 completes the counting. In this example, the fan stop command is output with some delay. In the example of FIG. 3, the fan stop command generating means 75 is realized by a step ST19.

Moreover, when the combustion flame in the pot 15 is reduced, the incomplete combustion gas is easily generated. In this example, the size of a flame in the pot 15 is detected by using the flame detecting means 39 for detecting a flame. If the flame has a smaller size than a predetermined size, the rotational speed of the first motor 25 for driving the combustion fan 23 is reduced. When the flame is reduced, the rotational speed of the first motor 25 for driving the combustion fan is decreased. When the flame is reduced, the amount of air required for the combustion of the unburnt gas is reduced. Consequently, the rotational speed of the combustion fan 23 is reduced to decrease the amount of air flow. Thus, complete combustion can be almost obtained. Second rotation decrease command generating means 75 decides that the combustion flame becomes smaller than a predetermined size by comparing an output I of the flame detecting means 31 with a reference value Iref. When the relationship of I<Iref is established, a rotation decrease command for decreasing the rotation of the first motor 25 is output to the combustion fan control means 49. Thus, the extinction can be carried out with a good balance of an air/fuel ratio of the unburnt gas to the air, and the amount of. generation of the incomplete combustion gas can be decreased. In the case in which the rotational speed of the combustion fan 23 is reduced to decrease the amount of air flow, it is preferable that the amount of air flow of the combustion fan 23 should be maintained to be small after the complete extinction. Thus, the pot 15 to be heated by the electric heater 31 and the stabilizing member 16 in the pot 15 are cooled with difficulty depending on the amount of air flow. Consequently, even if the fuel flows out of the fuel feeding pipe 37 after the complete extinction, the oxidization of the fuel is instantaneously accelerated so that the generation of the bad odor can be lessened. In the example of FIG. 3, the second rotation decrease command generating means 75 is realized by steps ST14, ST15 and ST16.

It is preferable that the first time period T1 of the first timer 63 should be set to a time in which the electric heater 31 should be continuously conducted after the flow of the fuel out of the fuel feeding pipe 37 is stopped, and furthermore, the combustion fan 23 and the convection fan 11 continue the rotation for a while to cool the inside of the frame member 1 down to a safe temperature.

What is claimed is:

1. A pot type oil burner comprising:
   a frame body having an air outlet in a front part thereof;
   a cylindrical bottomed pot provided in the frame body and having a large number of through holes for air flow on a peripheral wall;
   a combustion fan including a first motor as a driving source and serving to supply combustion air into the pot through the through holes;
   combustion fan control means for controlling rotation or the first motor, thereby controlling an amount of air flow from the combustion fan;
   fuel feeding means for feeding a fuel into the pot through a fuel feeding pipe;
   fuel feeding control means for controlling a driving operation of the fuel feeding means;
   an electric heater to be energized from a start of ignition to a start of combustion, to heat the pot;
   heater control means for controlling the energization to the electric heater;
   a convection fan including a second motor as a driving source, attached to the frame body to feed air from an outside of the frame body into the Frame body and to blow out the air into a room through the air outlet together with a combustion gas discharged from the pot;
   fan control means for controlling rotation of the second motor, thereby controlling an amount of air flow from the fan; and
   a control command generator for giving a control command to the combustion fan control means, the fuel feeding control means, the heater control means and the convection fan control means, respectively,
   the control command generator outputs a fuel feeding stop command for stopping the driving operation of the fuel feeding means to the fuel feeding control means and outputs a heater energization command to the heater control means, in order to energize the heater for a predetermined first time period which is longer than a time period required for completely ending combustion, when an extinction command is input,
   outputs a rotation decrease command for decreasing the rotation of the second motor to the convection fan control means so as to decrease the amount of air from the convection fan, after a predetermined second time period equivalent to a time period to be considered to start incomplete combustion after the extinction command is input passes, while a predetermined third time period to be considered to be required for reducing a combustion flame or extinguishing the flame in the pot then passes, and
   outputs a fan stop command for stopping the combustion fan and the convection fan to the combustion fan control means and the convection fan control means after the first time period is ended.

2. The pot type oil burner according to claim 1, wherein the control command generator includes:
   fuel feeding stop command generating means for outputting a fuel feeding stop command to stop the driving operation of the fuel feeding means to the fuel feeding control means when an extinction command is input;
   a first timer for starting counting when inputting the extinction command, and for counting a predetermined first time period which is longer than a time period required for completely ending combustion;
   heater energization command generating means for energizing the heater, thereby outputting, to the heater control means, a heater energization command for heating the pot until the first timer completes the counting;
   a second timer for counting a second time period at the end of which period the combustion flame in the pot its so small that incomplete combustion gas is generated, after inputting the extinction command;
   a third timer for counting a third time period at the end of which period the combustion flame is considerably reduced or completely extinguished in the pot after the second timer completes the counting;
   rotation decrease command generating means for outputting, to the convection fan control means, a rotation decrease command to decrease the rotation of the second motor so as to decrease an amount of air flow of the convection fan while the third timer carries out the counting; and
   fan stop command generating means for outputting a fan stop command to stop the combustion fan and the convection fan to the combustion fan control means and the convection fan control means after the first timer completes the counting.

3. The pot type oil burner according to claim 2, wherein the rotation decrease command generating means outputs the rotation decrease command to decrease the rotational speed of the second motor such that the air blown out of the air outlet is raised upward as soon as possible.

4. The pot type oil burner according to claim 2, further comprising rotation increase command generating means for outputting, to the convection fan control means, a rotation increase command to increase the rotational speed of the second motor after the third time period passes.

5. The pot type oil burner according to claim 2, wherein the fan stop command generating means outputs the fan stop command to stop the combustion fan and the convection fan after the heater de-energization command is output.

6. The pot type oil burner according to claim 1, further comprising forced braking means for forcedly applying braking to the seconded motor,
   the convection fan control means serving to operate the forced braking means, thereby rapidly decreasing the rotational speed of the motor of the convection fan when inputting the rotation decrease command.

7. The pot type oil burner according to claim 6, wherein the convection fan control means is constituted so as to gradually decrease the rotational speed of the motor after operating the forced braking means, the control command generator further includes reset means for resetting the third timer and rotational speed detecting means for detecting a rotational speed of the second motor, and the reset means is operated to reset the third timer, thereby bringing the third timer into a counting completion state when the rotational speed detected by the rotational speed detecting means is equal to or lower than a predetermined rotational speed.

8. The pot type oil burner according to claim 6, wherein the second motor is an AC inductor motor and the forced braking means causes a DC current to flow to an exciting winding of the AC induction motor.

9. The pot type oil burner according to claim 1, further comprising flame detecting means for detecting a size of a combustion flame in the pot, the control command generator further including another rotation decrease command generating means for outputting, to the combustion fan control means, another rotation decrease command for decreasing the rotational speed of the first motor to decrease an amount of air flow of the combustion fan when the flame detecting means detects that the combustion flame is smaller than a predetermined size.

\* \* \* \* \*

UNITED STATES PATENT AND TRADEMARK OFFICE
CERTIFICATE OF CORRECTION

PATENT NO.    : 6,390,807 B1
DATED         : May 21, 2002
INVENTOR(S)   : Osamu Niwa and Koichi Watanabe It is certified that error appears in the above-identified patent and that said Letters Patent is hereby corrected as shown below:

<u>Title page,</u>
Insert Item:
-- [73]   Assignee: Toyotomi Co., Ltd, Aichi-Ken, Japan --

Signed and Sealed this

Twenty-eighth Day of September, 2004

JON W. DUDAS
*Director of the United States Patent and Trademark Office*